United States Patent [19]

Freitag et al.

[11] Patent Number: 4,482,694

[45] Date of Patent: Nov. 13, 1984

[54] HIGH MOLECULAR WEIGHT AROMATIC POLYESTERS AND PROCESSES FOR THEIR PRODUCTION

[75] Inventors: Dieter Freitag, Krefeld; Uwe Hucks, Alpen; Hans-Jürgen Meissner, Krefeld, all of Fed. Rep. of Germany

[73] Assignee: Bayer Aktiengesellschaft, Leverkusen, Fed. Rep. of Germany

[21] Appl. No.: 488,120

[22] Filed: Apr. 25, 1983

[51] Int. Cl.³ .................... C08G 63/14; C08G 63/18
[52] U.S. Cl. ................................ 528/176; 528/125; 528/126; 528/128; 528/173; 528/179; 528/180; 528/181; 528/182; 528/190; 528/191; 528/193; 528/194

[58] Field of Search ............... 528/125, 126, 128, 173, 528/176, 179–182, 193, 194, 190, 191

[56] References Cited

U.S. PATENT DOCUMENTS 3,702,838  11/1972  Wilson ................................ 528/182

*Primary Examiner*—Lester L. Lee
*Attorney, Agent, or Firm*—Connolly and Hutz

[57] ABSTRACT

High molecular weight aromatic polyesters having a low content of end groups and a very slight inherent color can be obtained according to the phase interfacial process wherein particular amines and a slight alkali excess are used.

9 Claims, No Drawings

HIGH MOLECULAR WEIGHT AROMATIC POLYESTERS AND PROCESSES FOR THEIR PRODUCTION

This invention relates to aromatic polyesters having a high molecular weight and based on iso- and/or terephthalic acid and diphenols, to a phase interface process for their production in the presence of certain tertiary amines with a defined alkali excess, and to the use of these polyesters for the production of mouldings, mainly by injection moulding.

Aromatic polyesters are known (W. M. Eareckson, J. Polym. Sci. XL, 339–406 (1959); Andre Conix, "Thermoplastic Polyesters from Bisphenols" Ind. Eng. Chem., Vol. 51, No. 2, 147–150, Febr. 1959; FR 1177517, U.S. Pat. No. 3,351,624, German Auslegeschrift No. 1445384). Due to their outstanding properties, they are widely used where a high dimensional stability under heat and a good impact or notched impact strength are desired.

Aromatic polyesters may be produced particularly advantageously by the phase interface process from aromatic dicarboxylic acid dichlorides and alkali diphenolates. This method is described in detail in the above-mentioned literature.

A pre-requisite for the use of aromatic polyesters as a moulding material is a sufficiently high molecular weight. The use of tertiary amines and quaternary ammonium salts is recommended in the literature in order to achieve this aim.

It is also desirable for many uses that the aromatic polyesters are as colourless as possible.

Surprisingly, it has now been found that it is possible to obtain aromatic polyesters having a particularly high molecular weight and a very slight inherent colour according to the phase interface process, wherein tertiary cycloaliphatic amines are used as catalysts and wherein the process is carried out using a slight alkali excess.

The present invention provides a phase interface process for the production of aromatic polyesters from iso- and/or terephthalic acid dichlorides, diphenols, chain-terminators and optionally branching agents in the presence of an alkali hydroxide and from 0.2 to 3.0, preferably from 0.5 to 1.5% by weight of tertiary amine, based on the aromatic dicarboxylic acid dichlorides used, characterised in that the process is carried out using an excess of from 0.3 to 1.8, preferably from 0.5 to 1.1 mol % of alkali hydroxide, based on phenolic hydroxyl groups, and the tertiary amine contains from 1 to 4, preferably 1 or 2 heteroatoms incorporated in a 4- to 7-membered cyclo-aliphatic compound, at least one of these heteroatoms being a tertiary nitrogen atom.

Oxygen and/or sulphur atoms, for example, may be used as heteroatoms, in addition to nitrogen atoms. The cyclo-aliphatic tertiary amines may be condensed with one of two $C_5$–$C_8$ cycloaliphatic compounds or aromatic compounds. In this case, tertiary nitrogen atoms may also function as bridge head atoms.

The following are included as preferred tertiary amines within the context of the present invention, for example N—$C_1$-$C_6$-alkyl-pyrrolidines, -piperidines, -morpholines, -dihydroindoles, -dihydroisoindoles, -tetrahydroquinolines, -tetrahydroisoquinolines, -benzomorpholines, 1-azabicyclo-[3,3,0]-octane, quinuclidine, N—$C_1$-$C_6$-alkyl-2-azabicyclo-[2,2,1]-octane, N—C-1-$C_6$-alkyl-2-azabicyclo-[3,3,1]-nonane and N—$C_1$-$C_6$-alkyl-3-azabicyclo-[3,3,1]-nonane.

N-ethylpyrrolidine, N-ethylpiperidine, N-ethylmorpholine, N-isopropylpiperidine and N-isopropylmorpholine are particularly preferred.

Potassium hydroxide and, in particular sodium hydroxide are included as suitable alkali hydroxides. The excess relates to all phenolic hydroxyl groups including phenolic chain terminators and any branching agents which may be used.

The process according to the present invention may be carried out either continuously and in batches.

This invention also provides aromatic polyesters containing iso- and/or terephthalic acid radicals, diphenol radicals, radicals of chain-terminators and optionally branching agents, characterised in that they have a relative viscosity of more than 1.25, preferably more than 1.275 (measured on a solution of 0.5 g of polyester in 100 ml of dichloromethane solution at 25° C.), they contain less than 0.25% by weight, preferably less than 0.20% by weight, of free carboxyl groups, less than 30 ppm, preferably less than 10 ppm, of saponifiable chlorine, and in that they have a yellow value G (according to DIN 6167) of less than 20.

The quantities relate to the aromatic polyester.

The present invention also provides the use of these aromatic polyesters for the production of mouldings, in particular for the production of injection moulded articles.

The aromatic polyesters which are to be produced according to the present process usually have relative viscosities of from 1.18 to 2.0, preferably from 1.2 to 1.5 (measured on a solution of 0.5 g of polyester in 100 ml of dichloromethane solution at 25° C.).

Diphenols which are preferred for the production of the aromatic polyesters are compounds corresponding to the formula (I):

HO—Z—OH   (I)

wherein Z represents a divalent, mono- or multinuclear aromatic radical having from 6 to 30 carbon atoms, Z being composed such that the two OH groups are each directly bound to a carbon atom of an aromatic system.

Diphenols which are particular preferred are compounds corresponding to the formula:

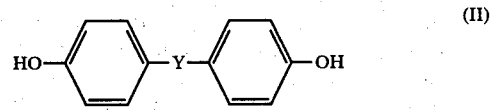

(II)

wherein
Y represents a direct bond, an alkylene or alkylidene radical having from 1 to 7 carbon atoms, a cycloalkylene or cycloalkylidene radical having from 5 to 12 carbon atoms, —O—, —S—,

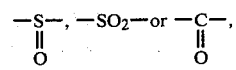

$$-\underset{\underset{O}{\|}}{S}-,\ -SO_2-\ \text{or}\ -\underset{\underset{O}{\|}}{C}-,$$

and nuclear-alkylated and nuclear-halogenated derivatives thereof, for example:
hydroquinone,
resorcinol,
dihydroxydiphenyls, bis-(hydroxyphenyl)-alkanes,
bis-(hydroxyphenyl)-cycloalkanes,
bis-(hydroxyphenol)-sulphides,
bis-(hydroxyphenyl)-ethers,
bis-(hydroxyphenyl)-ketones,
bis-(hydroxyphenyl)-sulphoxides,
bis-(hydroxyphenol)-sulphones, and
α,α'-bis-(hydroxyphenyl)-diisopropylbenzenes
and nuclear-alkylated and nuclear-halogenated compounds thereof, in particular, for example: bisphenol A=2,2-bis-(4-hydroxyphenyl)-propane, tetramethylbisphenol A, 1,1-bis-(4-hydroxyphenol)-isobutane, 1,1-bis-(4-hydroxyphenyl)-cyclohexane, 4,4'-dihydroxydiphenylsulphide, 4,4'-dihydroxydiphenyl, 4,4'-dihydroxydiphenylsulphone and di- and tetra-halogenated derivatives thereof. Bisphenol A is particularly preferred. Any mixtures of the above-mentioned diphenols may also be used.

The following are preferably used as chain-terminators for the aromatic polyesters: phenol, alkylphenols having $C_1$–$C_{18}$ alkyl groups, halogenated phenols, hydroxy-diphenyl, naphthols, chlorocarbonic acid esters of such phenolic compounds and chlorides of aromatic monocarboxylic acids which may be substituted by $C_1$–$C_{18}$ alkyl groups and halogen atoms, in quantities of from 0.1 to 10 mol % (in the case of phenols and chlorocarbonic acid esters, based on diphenols, in the case of acid chlorides, based on acid dichlorides).

Tri- or higher functional carboxylic acid chlorides or tri- and higher valent phenols are preferably used as branching agents for the aromatic polyesters in quantities of from 0.01 to 1 mol %, based on the dicarboxylic acid chlorides used or on the diphenols used.

Moreover, the aromatic polyesters may contain up to 10 mol % of acid anhydride groups (based on the total of carboxylic acid ester groups, carbonate groups and anhydride groups).

The aromatic polyesters produced according to the present invention may, or course, contain stabilizers, for example aliphatic and aromatic phosphites, flow auxiliaries, for example low molecular weight carboxylic acid esters, colouring pigments, such as carbon black and titanium dioxide, and they may contain up to 60% by weight, based on the filled aromatic polyester, of optionally reinforcing fillers, for example chalk powder, quartz powder, talcum, carbon fibres and glass fibres. The additives may be worked into the melt of the polyesters during or after the production or during processing of the polyesters.

The aromatic polyesters produced according to the present invention may be processed into, for example mouldings such as lamp fitments, light switches, plugs, and housings for electrical appliances, semifinished products and films on standard processing machines and the processing products are distinguished by a remarkably high strength and transparency and by a particularly slight inherent colouring.

The percentages in the following Examples are based on the weight, unless otherwise indicated.

EXAMPLES

The yellow value G was determined on polyester injection moulding having dimensions of 40×40×4 mm according to DIN 6167 using light type D 65/10° observers.

EXAMPLE 1

4.567 kg (20.03 mols) of bisphenol A (=BPA) were dissolved in a mixture of 3.656 kg (41.13 mols) of 45% aqueous sodium hydroxide and 112 liters of water, under a nitrogen atmosphere. After adding 7 g of sodium borohydride, 22.6 ml of N-ethylpiperidine (=1 mol %, based on BPA), 20 kg of dichloromethane and 14 kg of chlorobenzene, 10.15 kg (20 mols) of a 40% solution of iso- and terephthalic acid dichloride (1:1) in chlorobenzene and 136 g (3.3 mol % based on BPA) of p-iso-octylphenol dissolved therein were added over a period of 5 minutes with vigorous stirring, and then stirred for 30 minutes. For working up, the phases were separated, the organic phase was washed with water until it was free from electrolyte, and then evaporated.

EXAMPLES 2 TO 9, COMPARATIVE EXAMPLES 1 TO 4

Some catalysts according to the present invention and some prior art catalysts were used in other experiments. The test results are provided in the Table.

The reaction took place in each case analogously to Example 1 using 1 mol % of catalyst (based on BPA).

TABLE

| | Catalyst | Relative Viscosity | Yellow value G |
|---|---|---|---|
| Example | | | |
| 1 | N—ethylpiperidine | 1.334 | — |
| 2 | N—ethylmorpholine | 1.344 | 14.5 |
| 3 | N—ethylpyrrolidine | 1.328 | 17.8 |
| 4 | Quinuclidine | 1.314 | 12.3 |
| 5 | N—isopropyl-1-tetrahydroquinidine | 1.337 | 8.5 |
| 6 | N,N'—diethylpyrazane | 1.323 | 15.2 |
| 7 | N—methyl-pyrrolidine | 1.331 | 13.4 |
| 8 | N—butyl-dihydro-1 indole | 1.316 | 16.7 |
| 9 | N—ethyl-benzomorpholine | 1.339 | 9.1 |
| Comparative Examples | | | |
| 1 | Triethylamine | 1.253 | 55.1 |
| 2 | Trimethylamine | 1.248 | 63.8 |
| 3 | Tetrabutylammonium-bromide | 1.277 | 47.5 |
| 4 | Trimethylbenzyl-ammonium-chloride | 1.285 | 53.7 |

We claim:
1. A phase interface process for the production of aromatic polyesters from iso- and/or terephthalic acid dichlorides, diphenols, chain terminators and optionally branching agents, in the presence of an alkali hydroxide and from 0.2 to 3.0% by weight of tertiary amine, based on the aromatic dicarboxylic acid dichlorides used, wherein the process is carried out using an excess of from 0.3 to 1.8 mol % of the alkali hydroxide, based on phenolic hydroxyl, and the tertiary amine contains from 1 to 4 heteratoms incorporated in a 4- to 7-membered cycloaliphatic compound, at least one of these heteroatoms being a tertiary nitrogen atom.

2. A process according to claim 1, characterised in that it is carried out in the presence of from 0.5 to 1.5% by weight of the tertiary amine, based on the aromatic dicarboxylic acid dichlorides used.

3. A process according to claim 1, characterised in that it is carried out using an excess of from 0.5 to 1.1 mol % of the alkali hydroxide, based on phenolic hydroxyl groups.

4. A process according to claim 1, characterised in that the tertiary amine contains 1 or 2 heteroatoms incorporated in the 4- to 7-membered cycloaliphatic compound.

5. An aromatic polyester containing iso- and/or terephthalic acid radicals, diphenol radicals, radicals of chain-terminators and optionally branching agents, characterised in that it has a relative viscosity of more than 1.25 (measured on a solution of 0.5 g of polyester in 100 ml of dichloromethane solution at 25° C.), it contains less than 0.25% by weight of free carboxyl groups, less than 30 ppm of saponifiable chlorine, and it has a yellow value G (according to DIN 6167) of less than 20.

6. An aromatic polyester according to claim 5, characterised in that it has a relative viscosity of more than 1.275 (measured on a solution of 0.5 g of polyester in 100 ml of dichloromethane solution at 25° C.).

7. An aromatic polyester according to claim 5, characterised in it has contain less than 0.20% by weight of free carboxyl groups.

8. An aromatic polyester according to claim 5, characterised in it has contain less than 10 ppm of saponifiable chlorine.

9. A process according to claim 1, characterized in that the tertiary amine is selected from the group consisting of N-ethylpyrrolidine, N-ethylpiperidine, N-ethyl-morpholine, N-isopropylpiperidine and N-isopropylmorpholine.

* * * * *